UNITED STATES PATENT OFFICE.

THOMAS L. WILLSON, OF NEW YORK, N. Y., ASSIGNOR TO THE ELECTRO GAS COMPANY, OF WEST VIRGINIA.

PROCESS OF PRODUCING ILLUMINATING-GAS.

SPECIFICATION forming part of Letters Patent No. 553,550, dated January 28, 1896.

Application filed December 19, 1894. Serial No. 532,357. (No specimens.)

*To all whom it may concern:*

Be it known that I, THOMAS L. WILLSON, of the city, county, and State of New York, have invented a new and useful Improvement in the Production of Illuminating-Gas, of which the following is a full, clear, and exact description.

I have discovered that, under certain conditions, combustible gas can be enriched by adding thereto the products obtained by the heating of acetylene.

If acetylene is added to a non-luminous water-gas in its ordinary condition, the illuminating power of the acetylene after a short time is practically lost. If, however, there be added to such gas the gaseous products obtained from heating acetylene, the illuminating power remains.

The heat to be applied should be sufficient to cause a change in the acetylene-gas into its higher polymers and other products, while at the same time carbon is deposited which is not added to the resulting gas being enriched. This can be done by a heat approximating a low red heat. I may add such decomposition products either by primarily heating the acetylene and adding the gaseous products in determined percentage to the gas, or I may add the acetylene and pass the combustible gas carrying the acetylene through a fixing retort or heated tubes. They should be, approximately, of a red to a bright-red heat, and I may add from ten to twenty-five per cent. of the volume of the combustible gas in such decomposed products of acetylene. The result of this action is to prevent a decomposition of the acetylene, which would occur if the acetylene were added to such water-gas without either prior or subsequent heating. I am not informed as to what the chemical action is; but it is probable that a new carbon compound is formed under these conditions; and it is the formation of such compound and the consequent destruction or reduction of the illuminating power that I am desirous of avoiding. It is probable that a combination may occur between the hydrogen of the water-gas and the acetylene, as follows:

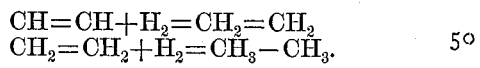

$$CH=CH+H_2=CH_2=CH_2$$
$$CH_2=CH_2+H_2=CH_3-CH_3.$$

I may add the products obtained by heating acetylene as well to coal-gas or enriched water-gas; but the especial advantages of the process are to be derived from the addition of such products to a practically non-luminous gas.

I do not claim broadly the heating of acetylene in hot tubes for the production of benzol, the same being old.

What I claim as my invention, and desire to secure by Letters Patent, is—

1. The process of producing illuminating gas by adding to a combustible gas the gaseous products of acetylene produced by heating the same in a heated chamber to a low red heat, substantially as described.

2. As a new product, illuminating gas consisting of the combination of a combustible gas and the gaseous products produced by heating acetylene, substantially as described.

In testimony whereof I have signed my name to this specification in the presence of two subscribing witnesses.

THOMAS L. WILLSON.

Witnesses:
H. CONTANT,
W. LAIRD GOLDSBOROUGH.